3,325,292
PREPARATION OF LIQUID SHORTENING AND PRODUCT

Joseph G. Endres, Downers Grove, and Leon A. Van Akkeren, Lombard, Ill., assignors to Armour and Company, Chicago, Ill., a corporation of Delaware
No Drawing. Filed Dec. 2, 1965, Ser. No. 511,234
9 Claims. (Cl. 99—118)

This invention relates to the preparation of liquid shortening and product.

This application is a continuation-in-part of our copending application, Ser. No. 213,893, filed Aug. 1, 1962, now abandoned.

A liquid shortening must have functional properties similar to those possessed by plastic shortenings so that it can be used in the preparation of baked goods, such as cakes, etc., but in addition the liquid shortening must have certain physical properties. It must be pourable down to at least 65° F., and it must not separate into liquid and solid fractions during normal storage and use, and also it must not cake on the sides of the container at lower temperatures.

Shortenings may be prepared by combining an emulsifier or emulsifier system, a triglyceride oil, and a saturated triglyceride, and the mixture may be processed by heating to melt the fat solids, deaerating, chilling to crystallizing temperatures, and finally warming to room temperatures. Unfortunately, when such a shortening combining ingredients in proportions which give the desired functional characteristics for baking is prepared by such processing, the final composition is not pourable at temperatures of 60° F. to about 90° F., and the shortening composition therefore is not useful as a liquid shortening. We have discovered that a shortening formed from substantially the same ingredients can be prepared so as to have the product pourable at temperatures of 60° F. to above 90° F. by processing fractions of the ingredients separately and later combining the fractions. Not only is the resulting composition a liquid shortening, but also it has functional characteristics equal to or superior to those of plastic shortenings.

A primary object, therefore, is to provide for the preparation of a liquid shortening meeting the above requirements and which will produce high quality baked products. A further object is to provide a method for preparing such a liquid shortening, while at the same time providing a pourable suspension of fat particle solids in oil at temperatures of about 60° F. to above 90° F. Yet another object is to provide a process in which two separately-chilled components of the shortening are blended to provide a liquid and pourable composition. Yet another object is to provide an improved shortening composition effective for baking cakes of large volume and high quality and bakery products produced by the use of such composition. A still further object is to provide a process for the production of a liquid shortening which does not separate into components or layers after long storage. Other specific objects and advantages will appear as the specification proceeds.

In one embodiment of our invention, we blend a saturated triglyceride, a triglyceride oil, and a shortening emulsifier or system, heating the mixture to melt the solid fats, chilling to crystallize, and then warming slowly to the desired temperature. In the preferred procedure, we separate the triglyceride oil into two fractions, blending one fraction with the shortening emulsifier, blending the other fraction with the saturated triglyceride, heating each fraction to melt the solid fats, deaerating the melted fats under vacuum at about 120–180° F., chilling the fractions separately to crystallize the same, and then blending the crystallized fractions. The crystallized fractions may be blended at temperatures of 50° F. and above up to about room temperature, but we prefer to warm the separately crystallized fractions to about 70–75° F. and to blend them at this temperature. The combined fractions form a liquid shortening pourable within the range of 60° F. to about 90° F.

As a specific illustrative example, the following may be set out:

A triglyceride oil, such as soybean oil hydrogenated to a 100 iodine value, is divided into two fractions. One fraction is blended with an emulsifier system which may consist of 1.5% stearyl 2 lactylic acid, 2.5% propylene glycol monostearate, and 4.5% hydrogenated tallow monoglycerides. The emulsifier and soybean oil are then deaerated and chilled under vacuum, the level of the emulsifier being twice that desired in the final liquid shortening. Sufficient 100 I.V. soybean oil is added to make 100 parts. Similarly, the saturated triglyceride oil (soybean oil flakes) at twice the desired level and with 100 I.V. soybean oil is similarly processed, being heated, deaerated, and chilled, and finally warmed to room temperature. The two separately crystallized fractions are semi-solid, non-pourable materials even at room temperature. However, when the two systems are blended on about a 50/50 basis, it is found that the product is an easily-pourable, stable, and functional product.

In contrast, when the saturated triglyceride, the triglyceride oil, and the emulsifier are initially combined and then heated, deaerated, vacuum cooled, and then warmed to room temperature, it found that a non-pourable product is produced.

While a single emulsifier system has been suggested in the above example, it will be understood that those emulsifiers or emulsifier systems commonly employed in the preparation of shortenings may be employed, such as, for example, lactostearin, lactopalmitate, tallow or lard monoglycerides, propylene glycol monostearate, and other emulsifiers employed in combinations and systems. We prefer to employ in the shortening product from 6–10% of the emulsifier, best results being obtained when the emulsifier content is 7–9%.

The triglyceride oils may be vegetable triglyceride oils, such as, for example, cottonseed, peanut, soybean, etc., oils, and we prefer to employ in the shortening about 85–90% of the triglyceride oil. Best results have been obtained where the triglyceride oil is 86–88% by weight of the shortening.

The saturated triglyceride is a fully hydrogenated triglyceride oil, and the saturated triglyceride level in the finished liquid shortening is preferably 2–10% by weight, best results being obtained when the level is between 5–8%.

As stated above, when the two systems are blended on about a 50/50 basis the product is an easily-pourable, stable and functional product. Such a product is also obtained where the first fraction consists of as little as 25% vegetable oil containing emulsifier and the second fraction consists of as much as 75% vegetable oil containing the saturated triglyceride (flakes). In other words, the first fraction may comprise 25–50% vegetable oil containing the emulsifier, and the second fraction may comprise 75–50% vegetable oil containing the saturated triglyceride.

If desired, about 1–1.5% of the saturated triglyceride (flakes) may be added to the first fraction and the remaining saturated triglyceride (2–9 to 2–8.5%) added to the second fraction. In other words, we find that a small amount of the saturated triglyceride (flakes) may be added to the first fraction and subtracted from the second fraction while still producing a product which is easily-pourable, stable, and functional.

In the step of combining the fractions, we find that the two systems can be blended at a temperature of about 50° F. or above, but best results have been obtained when the blending is accomplished after the fractions are separately warmed to about 70–75° F.

Specific examples illustrative of the invention may be set out as follows:

Example I

An emulsifier system consisting of 1.5% stearyl 2 lactylic acid, 2.5% propylene glycol monostearate, and 4.5% of a hydrogenated tallow monoglyceride, was blended with a triglyceride oil consisting of soybean oil hydrogenated to a 100 iodine value. The emulsifier system and the triglyceride oil were de-aerated and quickly chilled under vacuum to 55° F. The level of the emulsifier system was twice that desired in the final liquid shortening, sufficient 100 I.V. soybean oil being added to make 100 parts. Then the fully hydrogenated soybean oil (soybean flakes) at twice the desired level, together with 100 I.V. soybean oil (making a total of 100 parts), were subjected to the same procedure. The desired level of flakes in the final product was 7.5% by weight.

Both of the above separately-crystallized fractions were warmed slowly (preferably at about 1° F. per minute) to about room temperature. In the above processing where heat is necessary to melt the fat, it is preferred to subject the mixture to vacuum at the very beginning of the heating so as to deaerate or remove the bulk of the air during the heating stage.

The resulting two separate products were semi-solid and non-pourable materials after the chilling process. The two products then were blended on about a 50/50 basis by weight and it was found that the blended materials were easily pourable, stable, and produced a cake of high volume, as shown in Example III. The product was pourable at 60° F. and did not break in the range of 60° to 90° F. The product did not break or separate when it was alternated between 60° and 90° F. for an extended period of time.

Example II

An emulsifier system as described in Example I was combined with soybean oil hydrogenated to a 100 iodine value in the proportion of about 14 parts of emulsifier to 86 parts of soybean oil. Similarly, about 10 parts of fully hydrogenated soybean oil (soybean flakes) were combined with 90 parts of soybean oil hydrogenated to a 100 iodine value. The two fractions were then separately processed. To completely melt the fat, the temperature was raised to 160° F. Each fraction was deaerated, then quickly cooled to a temperature of about 55° F. Then while still under vacuum, the fractions were slowly warmed to room temperature and vacuum then released. The two fractions were then combined and stirred to form a liquid shortening which was pourable at temperatures of 60–90° F. Cakes having the characteristics described more fully in Example III were produced by the use of the shortening. The shortening composition remained stable and did not separate after storage for 5 months.

Example III

An emulsifier system similar to that employed in Example I was blended with 7.5% of fully hydrogenated soybean oil and 84.0% of 100 iodine value soybean oil.

The process was carried out as described in Example I with the two portions being vacuum-treated separately and quickly chilled and the two portions then recombined to form a pourable liquid shortening. Baking tests were conducted, using the following formulas:

|  | 130% Sugar White | 130% Sugar Yellow |
| --- | --- | --- |
| Flour | 1 pound | 1 pound. |
| Shortening | 8½ ounces | 7½ ounces. |
| Sugar | 1 pound, 4¾ ounces | 1 pound, 4½ ounces. |
| Baking Powder | 1 ounce | ¾ ounce. |
| Salt | ½ ounce | ½ ounce. |
| Milk | 14¾ ounces | 15 ounces. |
| Egg Whites | 10¾ ounces |  |
| Whole Eggs |  | 8½ ounces. |

The liquid shortening produced a volume of 1155 cc. for white cakes and 1210 cc. for yellow cakes. A typical emulsified plastic shortening produces white cakes with a volume of 1050–1105 cc., and yellow cakes with a volume of 1055–1155 cc. The exterior and interior characteristics of cakes prepared from liquid shortenings were comparable to that obtained with plastic shortenings.

High ratio pound cakes having the following formula can be prepared from our liquid shortening:

| | |
| --- | --- |
| Flour | 1 pound. |
| Shortening | 11 ounces. |
| Sugar | 1 pound, 3¼ ounces. |
| Salt | ½ ounce. |
| Milk | 8 ounces. |
| Whole eggs | 11 ounces. |

Pound cakes from liquid shortenings had as good a volume (325 cc./100 gms.) as pound cakes prepared from emulsified plastic shortenings (300 cc./100 gms.). The exterior and interior characteristics of pound cakes from liquid shortenings were as good or better than those of plastic shortenings.

Example IV

Shortening compositions were prepared using the procedure described in Example I, the formulations and the cake baking results being set out below in Table I. The table also sets out the specific gravity of the batter, which gives an indication of the aeration of the batter, and the volume in cubic centimeters of the finished single layer cake (white cake—130% sugar):

TABLE I

[Composition and Performance of Liquid Shortenings in 130% Sugar White Cakes]

| Composition of Liquid Shortening | Specific Gravity | Volume in Cubic Centimeters |
| --- | --- | --- |
| 2% Acylated monoglyceride<br>4.5% Tallow monoglyceride<br>2.5% Propylene glycol monostearate<br>5.0% Fully hydrogenated soybean oil<br>86.0% 100 I.V. soybean oil | 0.93 | 1,055 |
| 5.0% Glyceryl lactopalmitin<br>3.0% Lard monoglycerides<br>5.0% Fully hydrogenated soybean oil<br>87.0% 100 I.V. soybean oil | 0.88 | 955 |
| 6.0% Glyceryl lactopalmitin<br>3.0% Propylene glycol monostearate<br>5.0% Fully hydrogenated soybean oil<br>86.0% 100 I.V. soybean oil | 0.83 | 972 |
| 6.0% Glyceryl lactostearin<br>3.0% Lard monoglycerides<br>5.0% Fully hydrogenated soybean oil<br>86.0% 100 I.V. soybean oil | 0.81 | 1,046 |
| 4.5% Lard monoglyceride<br>2.5% Propylene glycol monostearate<br>5.0% Fully hydrogenated soybean oil<br>88.0% 100 I.V. soybean oil | 1.07 | 1,013 |
| 5.0% Glyceryl lactopalmitin<br>3.0% Lard monoglyceride<br>5.0% Fully hydrogenated soybean oil<br>87.0% Cottonseed oil | 0.85 | 1,005 |
| 5.0% Glyceryl lactopalmitin<br>3.0% Lard monoglyceride<br>5.0% Fully hydrogenated soybean oil<br>87.0% Peanut oil | 0.84 | 997 |

Example V

A triglyceride oil (cottonseed oil) was divided into two fractions, the first fraction being 25 parts and the second fraction 75 parts. To the first fraction, containing 25 parts of the triglyceride oil, was added an emulsifier system as described in Example I at a level which was twice that desired in the final liquid shortening and on the basis of the final liquid shortening was 8.5 parts by weight. To the second fraction was added a fully hydrogenated soybean oil (flakes) in an amount twice that desired in the final liquid shortening, namely, 7.5 parts.

The first fraction was heated to about 150° F. and deaerated under vacuum and quickly chilled to about 50° F. to bring about crystallization. The second fraction was heated to 180° F. and deaerated under vacuum and quickly chilled under vacuum to 50° F., breaking the vacuum at that temperature. The two systems were blended at about 50° F. and then gradually warmed to a temperature of about 70–75° F.

The resulting product was found to be easily pourable, stable, and produced a cake of high volume, as shown in Example III. The product did not break or separate when it was alternated between 60° and 90° F. for a period of 30 days.

Example VI

The process was carried out as described in Example V except that the two fractions were separately warmed to a temperature of about 75° F. and then blended. The product obtained was comparable to that obtained in Example V.

Example VII

The process was carried out as described in Example VI except that to the first fraction a small amount of fully hydrogenated soybean oil (flakes) was added, the amount being 1% by weight based on the final product, and to the second fraction was added 6.5% solid triglyceride. The product obtained was comparable to that obtained in Example VI.

Why the two separately-processed or crystallized fractions become pourable and liquid when combined, while exactly the same components when processed together form a non-pourable shortening, we are unable to state. For some reason, the separately-crystallized fractions when brought together as above described lose their semisolid character and become liquid, while at the same time having improved functional characteristics and producing cakes of high quality and volume, as set out in the above examples.

While in the foregoing specification we have set forth specific procedure and shortening components in considerable detail for the purpose of illustrating embodiments of the invention, it will be understood that such details may be varied widely by those skilled in the art without departing from the spirit of our invention.

We claim:
1. In a process for preparing a liquid shortening, the steps of separating a quantity of triglyceride oil into a first and a second fraction, the first fraction containing 25–50% of said oil and the second fraction containing 75–50% of said oil, adding about 6–10% emulsifier by weight based upon the final product to said first fraction, adding about 2–10% solid triglyceride by weight based on the final product to said second fraction, separately chilling said first fraction to crystallize the same, separately chilling said second fraction to crystallize the same, and combining said first fraction and said second fraction at a temperature in the range of about 50° F. to about room temperature to form a liquid shortening having a stable suspension of fat particle solids in 85–90% oil by weight at temperatures within the range of about 60°–90° F.

2. The process of claim 1 in which about 1 to 1.5% of the solid triglyceride is added to said first fraction and to said second fraction is added about 2–9% to 2–8.5% solid triglyceride.

3. The process of claim 1 in which the two chilled fractions are warmed to about 70–75° F. and then combined.

4. The process of claim 1 wherein said emulsifier is added in an amount ranging from about 7–9% by weight.

5. The process of claim 1 wherein said solid triglyceride is added in an amount ranging from about 5–8% by weight.

6. The process of claim 1 wherein said triglyceride oil contained in the final shortening product is in an amount ranging from about 86–88% by weight.

7. The process of claim 1 in which the emulsifier is stearyl 2 lactylic acid, propylene glycol monostearate, and hydrogenated tallow monoglyceride.

8. The process of claim 1 wherein said separate chilling of said fractions is carried out under vacuum to deaerate.

9. In a process for preparing a liquid shortening, the steps of separating a quantity of triglyceride oil into about two equal first and second fractions, adding 6–10% emulsifier by weight based upon the final product to said first fraction, adding 2–10% solid triglyceride by weight based upon the final product to said second fraction, separately chilling said first fraction to crystallize the same, separately chilling said second fraction to crystallize the same, combining said first fraction and said second fraction to form a liquid shortening having a stable suspension of fat particle solids in 85–90% oil by weight at temperatures within the range of about 60–90° F.

References Cited

UNITED STATES PATENTS 2,846,312 8/1958 Lantz _____ 99—118
2,999,755 9/1961 Handschumaker et al. _ _ 99—118

A. LOUIS MONACELL, *Primary Examiner.*

M. W. GREENSTEIN, *Assistant Examiner.*